J. HARRINGTON.
GEAR CUTTING TOOL.

No. 82,402. Patented Sept. 22, 1868.

Witnesses
John Thomson
William Price

Inventor:
Jackson Harrington

United States Patent Office.

JACKSON HARRINGTON, OF NEW LONDON, CONNECTICUT, ASSIGNOR TO HIMSELF AND A. C. LIPPITT, OF SAME PLACE.

Letters Patent No. 82,402, dated September 22, 1868.

IMPROVED GEAR-CUTTING TOOL.

The Schedule referred to in these Letters Patent and making part of the same.

TO ALL WHOM IT MAY CONCERN:

Be it known that I, JACKSON HARRINGTON, of New London, county of New London, and State of Connecticut, have invented a new and useful Improvement in Cutters for Cutting the Teeth of Gears; and do hereby declare that the following is a full, clear, and exact description of the same, reference being had to the accompanying drawings, making part of this specification, of which—

Figure 1:
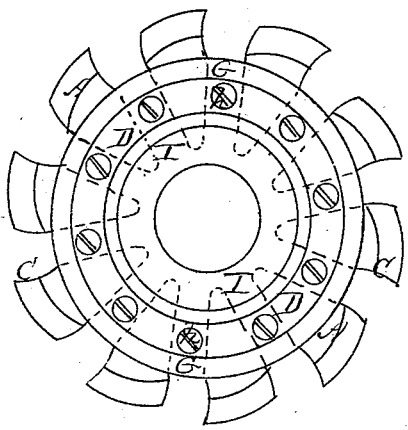

Figure 1 is an elevation.

Figure 2:
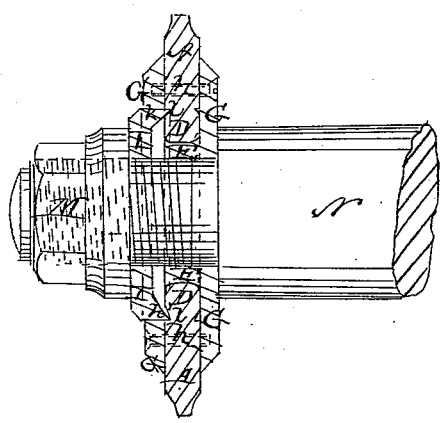

Figure 2, a transverse section on line of the journal.

Figure 3:
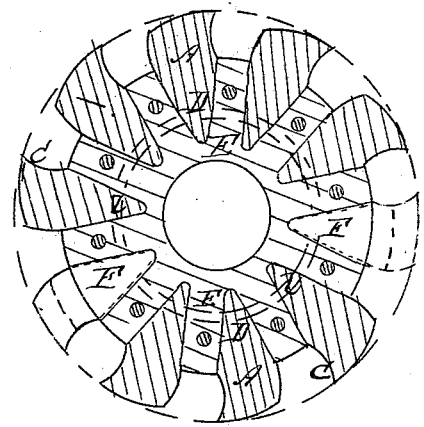

Figure 3, a section at right angles to the former, with two of the cutters removed from the socket.

Figure 4:

Figure 4, a side elevation of one of the cutters; and

Figure 5:

Figure 5 a face view of said cutter.

This invention relates to a novel improvement in that class of devices for cutting the teeth of gears which have a series of cutters whose cutting-faces correspond to the form and depth of tooth to be cut, and having tapering or V-shaped roots, which fit into tapering or V-shaped sockets in a circular holder, and there held in place by confining-plates, which are screwed on to the circular holder, embracing the cutters between them, and by a circular dog, which fits into circular grooves in the roots of the cutters, and which is braced against the cutters by a nut on the end of the carrying-shaft, rendering the whole a compact and solid body; and should one or more of the said cutters become worn from use, or broken, (by slacking the screws,) they can be easily removed, and replaced by new ones; and it further consists in the use of said circular socket-plate, confining-plates, circular dog, &c., for holding the said cutters in position during the operation of turning them by a former.

In this case the said cutters are placed the reverse, (or turned upside down) in the circular holder, of what they are when used for cutting the teeth of gears, so that their extremities are nearly in the line of a circumscribing circle, as shown in red lines in fig. 3; and thus the holder answers the double purpose of holding the cutters during the operation of forming the same to the desired shape, as well as for holding the cutters while cutting the teeth of gears.

In said drawings, A A, &c., denote the series of cutters; C C the cutting-faces, which correspond to the form and depth of tooth to be cut in the blank gear; and D D the V-shaped roots of the cutters. E is the circular holder or socket-plate, having V-shaped sockets, F F, &c., for reception of the roots, D D, of the cutters, said cutters being set at the proper angle in relation to the diameter of the circular socket-holder, (say at or about an angle of twenty-two degrees.) G G are the confining-plates, which are screwed on to the opposite sides of the socket-plate E by screws $h\,h$, embracing the cutters between the said plates, (see fig. 2.) I is the circular dog, with sharp circular projection, K, which fits into the circular recess J in the roots of the cutters, thereby preventing any movement of the cutters in the direction of their length; and M is the nut on the end of the carrying or driving-shaft N, which braces the dog against the roots of the cutters.

In operating my rotary cutter, the blank gear is placed on the ordinary dial, by means of which the number and pitch of teeth to be cut in the blank are regulated. Now, by setting my tooth-cutter in motion, and bringing the same up against the face of the blank, the teeth will be cut in said blank with great rapidity, especially in small plate-gears; and thus I produce a simple and effective device for cutting the teeth of gears, which will be found of great convenience to machinists.

Having described my invention, what I claim, and desire to secure by Letters Patent, is—

The series of cutters A A, in combination with the circular socket-plate or holder E and confining-plates G G, arranged substantially as and for the purposes described and set forth.

I also claim the circular dog I, circular recess J, and brace-nut M, when used in combination with the cutters A A and holder E, substantially as and for the purposes set forth.

In testimony whereof, I have hereunto set my signature, this 4th day of August, A. D. 1868.

JACKSON HARRINGTON.

Witnesses:
WILLIAM PRICE,
JOHN THOMSON.